(12) United States Patent
Huang et al.

(10) Patent No.: US 6,459,572 B1
(45) Date of Patent: Oct. 1, 2002

(54) LOCKING DEVICE

(75) Inventors: Chin Chu Huang; Chen Yu Yu, both of Taoyuan Shien (TW)

(73) Assignee: Delta Electronics Inc., Taoyuan Shien (TW)

( * ) Notice: Subject to any disclaimer, the term of this patent is extended or adjusted under 35 U.S.C. 154(b) by 0 days.

(21) Appl. No.: 09/957,759

(22) Filed: Sep. 21, 2001

(30) Foreign Application Priority Data

Dec. 12, 2000 (TW) .......................................... 89221539

(51) Int. Cl.$^7$ ................................................ G06F 1/16
(52) U.S. Cl. .................... 361/685; 361/696; 360/99.01; 369/34; 248/609
(58) Field of Search ................................ 361/685, 686, 361/727, 724–726, 690–696; 360/99.01, 99.12; 369/34, 36; 174/117 FF, 72 TR, 250; 248/60, 581, 609, 611, 634–635

(56) References Cited

U.S. PATENT DOCUMENTS 6,137,679 A * 10/2000 Chang ........................ 361/685
6,222,727 B1 * 4/2001 Wu ............................. 361/685
6,304,440 B1 * 10/2001 Lin ............................. 361/685

* cited by examiner

Primary Examiner—Darren Schuberg
Assistant Examiner—Hung Van Duong
(74) Attorney, Agent, or Firm—Volpe and Koenig, P.C.

(57) ABSTRACT

A locking device adapted to secure a retractable storing device in a frame of an electrical apparatus is provided. The locking device includes a main body, an activating element assembled with the main body and having an activating button and a first engaging member thereon, and a handle pivotally connected to the main body and having a second engaging member for engaging with the first engaging member when the retractable storing device is secured in the frame, wherein the activating button, being invisibly disposed in a concavity of the main body, is used for disengaging the second engaging member from the first engaging member when the retractable storing device is retracted from the frame.

10 Claims, 4 Drawing Sheets

LOCKING DEVICE

FIELD OF THE INVENTION

The present invention is related to a locking device, and more particularly to a locking device adapted to secure a retractable storing device in a frame of an electrical apparatus.

BACKGROUND OF THE INVENTION

A storing device, e.g. a disk array system, applied in an electrical apparatus, e.g. a personal computer, generally possesses a function of hot swap. That is, during the running process of the personal computer, the personal computer doesn't need to be shut down if the user of the personal computer would like to replace the disk array system, e.g. a hard disk or a CDROM, with another one for some purposes. What the user merely have to do is to retract the disk array system through a locking device assembled therewith. Conventionally, the disk array system combined with a locking device is disposed in a frame of the personal computer for securing which with the personal computer.

Please refer to FIG. 1 which is a schematic diagram illustrating a structure of a disk array system 11 combined with a conventional locking device 10 disposed in a frame 12 of a personal computer. The conventional locking device 10 includes a rotatable handle 101 and a key hole 102. The disk array system 11 is secured in the frame 12 of a personal computer (not shown). To replace the disk array system 11 during the running process of the personal computer with another one, the user have to insert the key into the key hole 102 first to unlock the disk array system 11. Thereafter, the disk array system 11 is retracted from the frame 12 by pulling the rotatable handle 101 out. Finally, another disk array system is then pushed into the frame 12 and secured therein by inserting the key into the key hole 102 to lock the disk array system 11. However, the structure of the locking device 10 is very complicated. Particularly, if one of the elements for locking the disk array system 11 in the frame 12 malfunctions, a big trouble would be made. In addition, by forming a key hole 102 for locking the disk array system 11 in the frame 12, the manufacturing cost is raised.

Please refer to FIG. 2 which is a schematic diagram illustrating a structure of a disk array system 11 combined with another conventional locking device 13 disposed in a frame 12 of a personal computer. The conventional locking device 13 includes a rotatable handle 131 and a locking element 132. The disk array system 11 is secured in the frame 12 of a personal computer (not shown). To replace the disk array system 11 during the running process of the personal computer with another one, the user have to push a locking member 1321 of the locking element 132 toward right first to unlock the disk array system 11. Thereafter, the disk array system 11 is retracted from the frame 12 by pulling the rotatable handle 131 out. Finally, another disk array system is then pushed into the frame 12 and secured therein by pushing the locking member 1321 of the locking element 132 toward left to lock the disk array system 11. Although the structure of the locking device 13 is not so complicated as that of FIG. 1, it is very easy for an infant or a child to arbitrarily retract the disk array system 11 by merely pushing the locking member 1321 of the locking element 132. Predictably, arbitrary locking/unlocking of the disk array system would result in easy damage of the locking device 13.

Accordingly, it is attempted by the present invention to overcome the drawbacks encountered in the prior arts.

SUMMARY OF THE INVENTION

An object of the present invention is to provide a locking device of simple structure adapted to secure a retractable storing device in a frame of an electrical apparatus.

Another object of the present invention is to provide a locking device adapted to secure a retractable storing device in a frame of an electrical apparatus for preventing from arbitrary locking/unlocking of the storing device.

According to the present invention, a locking device adapted to secure a retractable storing device in a frame of an electrical apparatus is disclosed. The locking device includes a main body, an activating element assembled with the main body and having an activating button and a first engaging member thereon, and a handle pivotally connected to the main body and having a second engaging member for engaging with the first engaging member when the retractable storing device is secured in the frame, wherein the activating button, being invisibly disposed in a concavity of the main body, is used for disengaging the second engaging member from the first engaging member when the retractable storing device is retracted from the frame.

Preferably, the storing device is a disk array system of a personal computer.

Preferably, the disk array system is a hard disk.

Preferably, the disk array system is a CDROM.

Preferably, the main body is made of plastic.

Preferably, the main body is formed by injection molding.

Preferably, the activating element is made of plastic.

Preferably, the activating element is formed by injection molding.

Preferably, the handle is made of plastic.

Preferably, the handle is formed by injection molding.

BRIEF DESCRIPTION OF THE DRAWING

The present invention may best be understood through the following description with reference to the accompanying drawings, in which.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
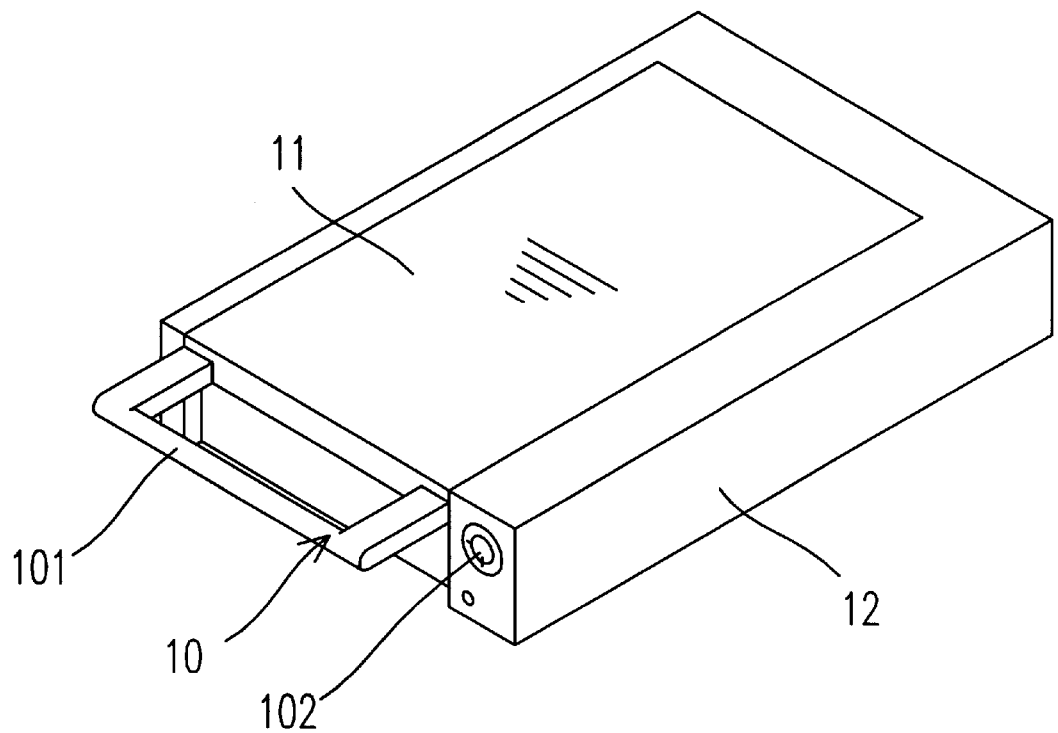
FIG. 1 is a schematic diagram illustrating a structure of a disk array system combined with a conventional locking device disposed in a frame of a personal computer.
Figure 2:
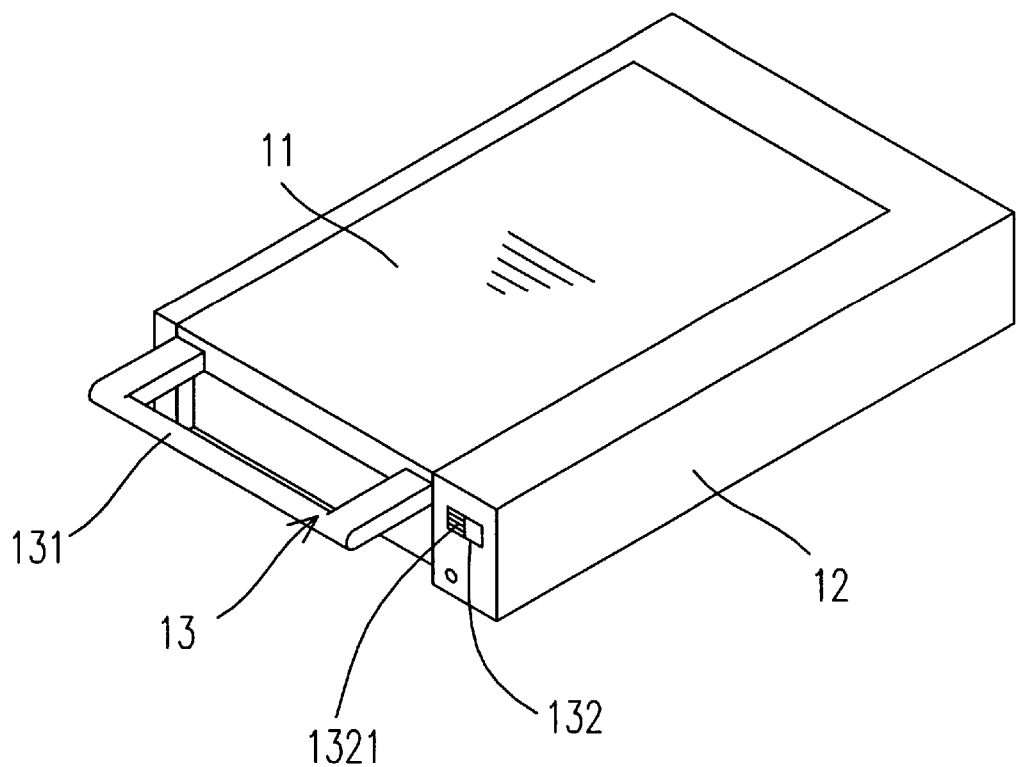
FIG. 2 is a schematic diagram illustrating a structure of a disk array system combined with another conventional locking device disposed in a frame of a personal computer.
Figure 3:
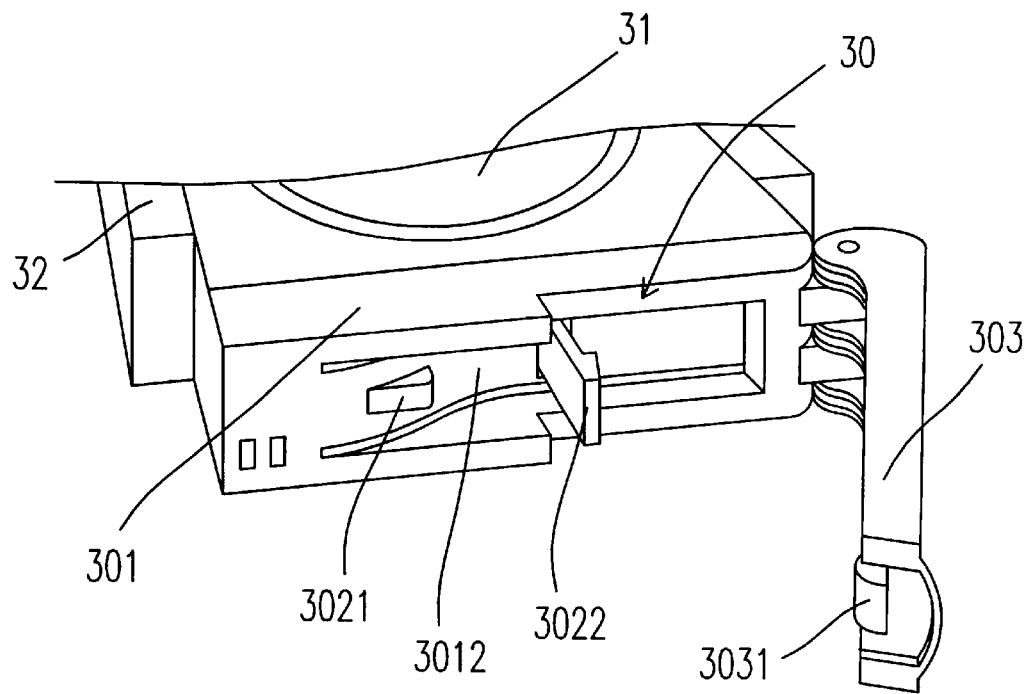
FIG. 3 is a schematic diagram illustrating a structure of a disk array system combined with a locking device disposed in a frame of a personal computer according to the present invention.
Figure 4:
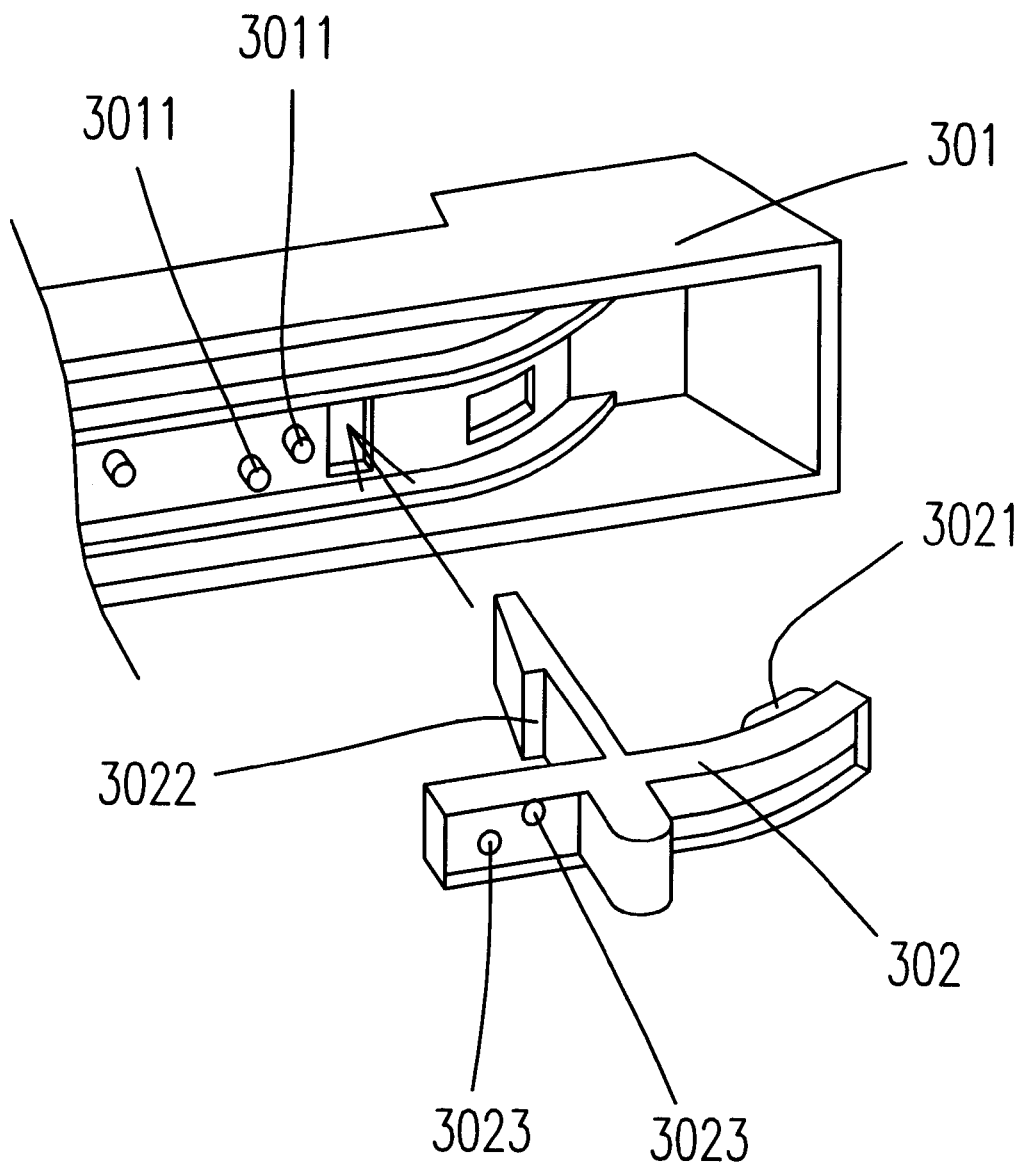
FIG. 4 is a schematic diagram illustrating a rear view of a locking device according to the present invention.

Herein, the present invention is illustrated by respectively using a disk array system and a personal computer as a storing device and an electrically apparatus. Please refer to FIGS. 3 and 4 which are schematic diagrams respectively illustrating a structure of a disk array system 31 combined with a locking device 30 disposed in a frame 32 of a personal computer, and a rear view of the locking device 30 according to the present invention. The locking device 30 is used for securing the disk array system 31 in the frame 32 of a personal computer (not shown). The locking device 30 includes a main body 301, an activating element 302 assembled with the main body 301 and having an activating button 3021 and a first engaging member 3022 thereon, and a handle 303 pivotally connected to the main body 301 and having a second engaging member 3031 for engaging with the first engaging member 3022 when the retractable disk array system 31 is secured in the frame 32. The activating button 3021 is used for disengaging the second engaging member 3031 from the first engaging member 3022 when the retractable disk array system 31 is retracted from the frame 32. For preventing an infant or a child from arbitrarily locking/unlocking the disk array system 31, the activating button 3021 is disposed in an invisible concavity 3012 of the main body 301. To assemble the activating element 302 with the main body 301, the first assembling member 3023 of the activating element 302 is engaged with the second assembling member 3011 of the main body 301 as shown in FIG. 4.

To replace the disk array system 31 during the running process of the personal computer with another one, the user just need to poke his finger into the invisible concavity 3012 of the main body 301 to press the activating button 3021 first. In the meantime, the second engaging member 3031 will be disengaged from the first engaging member 3022, i.e. the disk array system 31 is unlocked. Thereafter, the disk array system 31 is retracted from the frame 32 by pulling the handle 303 out. Then, another disk array system can be pushed into the frame 32 and secured therein by engaging the second engaging member 3031 with the first engaging member 3022, i.e. locking the disk array system 31.

Preferably, the main body, the activating element and the handle of the locking device is made of plastic. Certainly, the main body, the activating element and the handle of the locking device can be formed by injection molding.

According to the present invention, the structure of the locking device 30 is simple. In addition, the activating button 3021 is disposed in an invisible concavity 3012 of the main body 301 such that it's not easy for an infant or a child to arbitrarily press the activating button 3021 and therefore disengaging the second engaging member 3031 from the first engaging member 3022, i.e. unlocking the disk array system 31. Accordingly, the drawbacks encountered in the prior arts are solved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A locking device adapted to secure a retractable storing device in a frame of an electrical apparatus, comprising:

a main body;

an activating element assembled with said main body and having an activating button and a first engaging member thereon; and a handle pivotally connected to said main body and having a second engaging member for engaging with said first engaging member when said retractable storing device is secured in said frame, wherein said activating button, being invisibly disposed in a concavity of said main body, is used for disengaging said second engaging member from said first engaging member when said retractable storing device is retracted from said frame.

2. The locking device according to claim 1 wherein said storing device is a disk array system of a personal computer.

3. The locking device according to claim 1 wherein said main body is made of plastic.

4. The locking device according to claim 1 wherein said activating element is made of plastic.

5. The locking device according to claim 1 wherein said handle is made of plastic.

6. The locking device according to claim 2 wherein said disk array system is a hard disk.

7. The locking device according to claim 2 wherein said disk array system is a CDROM.

8. The locking device according to claim 3 wherein said main body is formed by injection molding.

9. The locking device according to claim 4 wherein said activating element is formed by injection molding.

10. The locking device according to claim 5 wherein said handle is formed by injection molding.

* * * * *